Feb. 12, 1935.  W. H. MURPHY  1,990,494
SYSTEM OF MAKING OBSERVATIONS AND DIRECTING GUN FIRE
Filed Aug. 21, 1934  4 Sheets-Sheet 1

INVENTOR
WILLIAM H. MURPHY
ATTORNEYS

Feb. 12, 1935.   W. H. MURPHY   1,990,494
SYSTEM OF MAKING OBSERVATIONS AND DIRECTING GUN FIRE
Filed Aug. 21, 1934   4 Sheets-Sheet 2
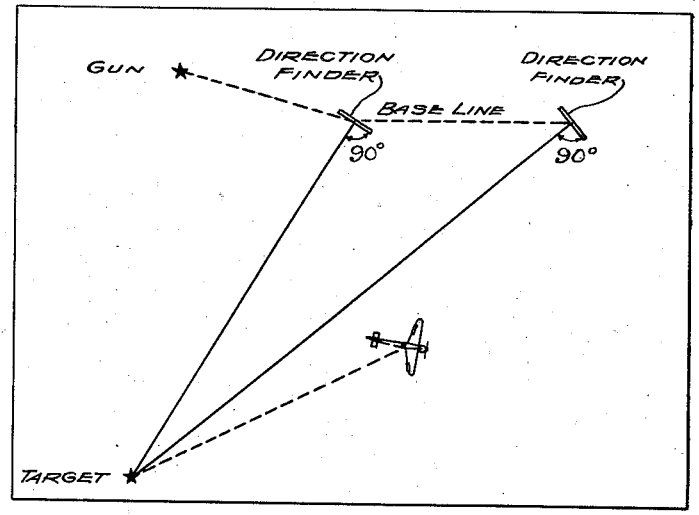
FIG. 2.
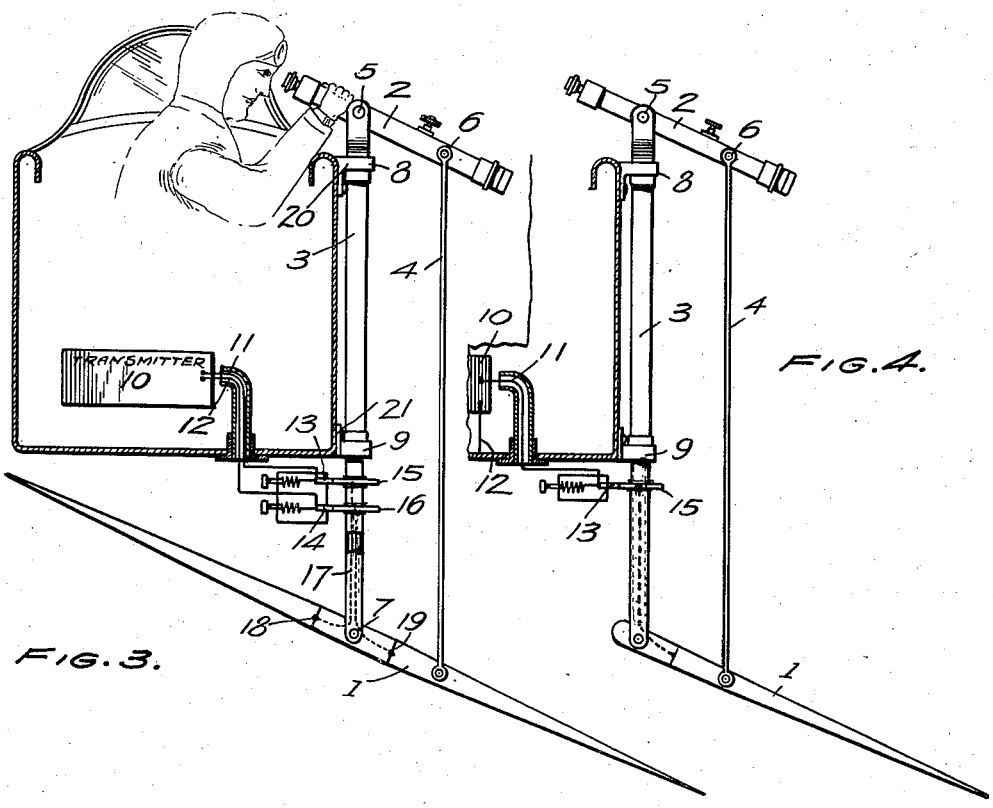
FIG. 3.
FIG. 4.
INVENTOR
WILLIAM H. MURPHY
ATTORNEYS Feb. 12, 1935.  W. H. MURPHY  1,990,494
SYSTEM OF MAKING OBSERVATIONS AND DIRECTING GUN FIRE
Filed Aug. 21, 1934  4 Sheets-Sheet 4
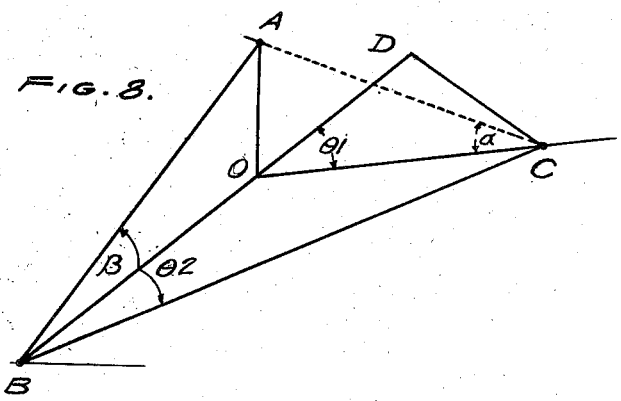
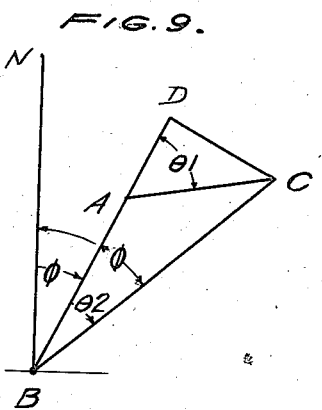
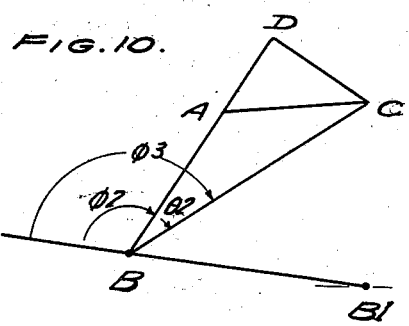
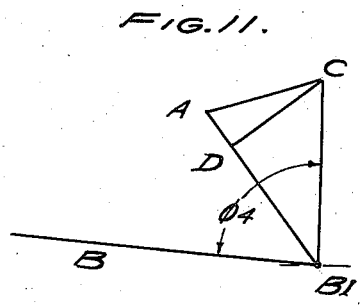
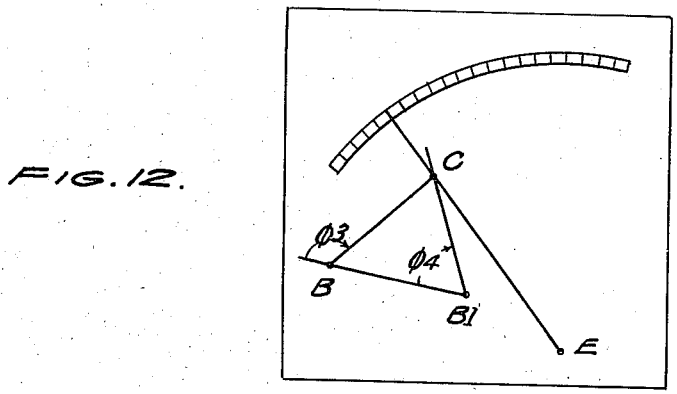
INVENTOR
WILLIAM H. MURPHY
BY Francis H. Vanderwerken
Charles A. Rowe
ATTORNEYS Patented Feb. 12, 1935

1,990,494

UNITED STATES PATENT OFFICE 1,990,494

SYSTEM OF MAKING OBSERVATIONS AND DIRECTING GUN FIRE

William H. Murphy, Washington, D. C.

Application August 21, 1934, Serial No. 740,802

12 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a system of making observations and directing gunfire.

The invention contemplates a system of locating an object from a point of observation in visual range of said object, whereby radio apparatus is coordinated with optical means to establish a directional relation between the object and one or more stations out of visual range of the object, and whereby the range and/or position of the object rather than the source of radio energy may be determined at the stations.

An important object of the invention is to provide a system of firing control for ordnance whereby an aerial observer in visual range of a target may transmit radio signals from which the position and range of the target may be directly determined for the use of battery stations, and without reckoning from the position of the radio transmitter as a datum point.

Another object of the invention is to provide a firing control system whereby the present practice of having an aircraft take a position directly over the target is avoided. After an approach toward the target, the craft turns away and in accordance with the invention accurate signal data may be transmitted from which the position of the target may be determined while the craft remains out of the zone of anti-aircraft fire.

Other objects and advantages will appear as the description proceeds.

In locating a target and directing artillery fire from radio equipped airplanes, working in cooperation with direction finding stations, the customary method is for the airplane to proceed to the target and when directly over the target to send a designated signal on its radio telegraph set. Several direction finding stations located along a base line pick up the signal and locate the bearing of the airplane. The assumed location of the airplane and with it the assumed location of the target will be determined by triangulation and transmitted to the battery commander. It has been demonstrated practically and proven mathematically that a direction finder operated in the usual way as above explained always points behind the airplane where a trailing antenna is used, thus causing errors in direction and position finding. It is the non-vertical polarization of the radiated electric field from such a trailing antenna which causes the errors. The error is somewhat modified by the fact that the current or radiated energy drops off to zero at the end of such a trailing antenna, although the upper part of the antenna which carries the greatest current and propagates the greatest part of the energy is nearly straight, that is, the equivalent of a trailing antenna nearly coincides with the upper part of the antenna. The error is a function of the angle between the upper part of the antenna and the horizontal, and of the height, distance and angle between the longitudinal axis of the airplane and the line of sight. Furthermore, it is known that an airplane using a trailing antenna and flying directly toward or away from a direction finder causes no error; and that the error increases to a maximum when the trace of the upper antenna section extended to earth subtends the greatest angle with respect to the vertical projection of the airplane.

In order to overcome the error, it has been found that instead of signalling when the airplane is directly above the target, the operator may signal when his theoretically extended effective antenna trace as projected onto the ground coincides with the target in line of sight, that is to say, when by sighting along the upper flat portion of a trailing antenna for example, the operator determines the instant when the antenna is longitudinally in a plane passing vertically through his point of observation and the target. It is at this instant that the radio signal must be transmitted with the result that the direction finder obtains a true bearing on the target, rather than on the airplane or the transmitter of radio wave energy.

The present invention employs radio signaling apparatus located at a vantage point, for example, on an aircraft whereby an observer on the craft and in visual range of an object such as a target may transmit signals under certain conditions in accordance with the principles of the invention to direction finding stations to enable said stations to obtain bearings on the target and then determine its range and position by known methods. The conditions are satisfied when the radio apparatus is provided with a radiating antenna which may be visually aligned with its longitudinal axis in a plane passing through the object or target and the point of observation. The manner of aligning antenna and target depends upon the character of antenna used. For example, a rigid dipole radiator or other similar form of antenna may be employed, in which case means are provided to couple a sighting element in operative relation with such rigid form of antenna and to positively maintain the relation during adjustment of the sighting element whereby said antenna is aligned longitudinally in a plane passing vertically through the observation point and target. Thus, the present invention contemplates a structural arrangement whereby the means of operatively coupling a sighting device and rigid antenna, includes the feature of automatically maintaining said device in parallelism with the antenna and in a given plane therewith throughout the range of adjustment of the device. In accordance with the theory of the present invention, said relation must be established and maintained while transmitting signals to one or more direction finding stations.

Where the craft is equipped with a trailing antenna, the craft may be maneuvered to establish the position of alignment of the optical axis of a sighting device with the effective portion of such an antenna. To determine the moment of alignment, the observer sights along the upper or effective part of the antenna, or parallel thereto, and when it is observed that the said upper part of the antenna has its longitudinal axis in optical alignment with the target and in a plane passing vertically through observation point and target, at the instant such alignment is established a signal is transmitted to be picked up at the direction finding stations. In practice a warning signal or signals would be sent so that the direction finding stations would be on the alert to catch the succession of signals which would be continued for such interval as the condition of alignment could be maintained. The result is that a direction finder or plurality of direction finders may be used to obtain a bearing or bearings on the target, and not on the aircraft, during the interval of such alignment. Two direction finders located on a base line may be used to locate the range and position of the target which information is then communicated to the battery stations.

The mode of operation and certain preferred embodiments of the invention will now be described with reference to the accompanying drawings, in which:

Fig. 2 depicts on a map surface projection the position of the direction finders on a given base line in relation to a target and gun emplacement, giving one position of the observing aicraft relative to the target;

Fig. 3 shows a preferred form of rigid antenna mounted on an airplane fuselage and operatively coupled to a radio transmitter, together with mechanical means for maintaining the antenna in parallelism with a sighting device;

Fig. 4 shows an alternative form of rigid antenna operative with a radio transmitter and means for maintaining the same in parallelism with a sighting device;

Figs. 8, 9, 10, 11 and 12 show a series of diagrams to assist in demonstrating the theory of the invention.

Figure 1:
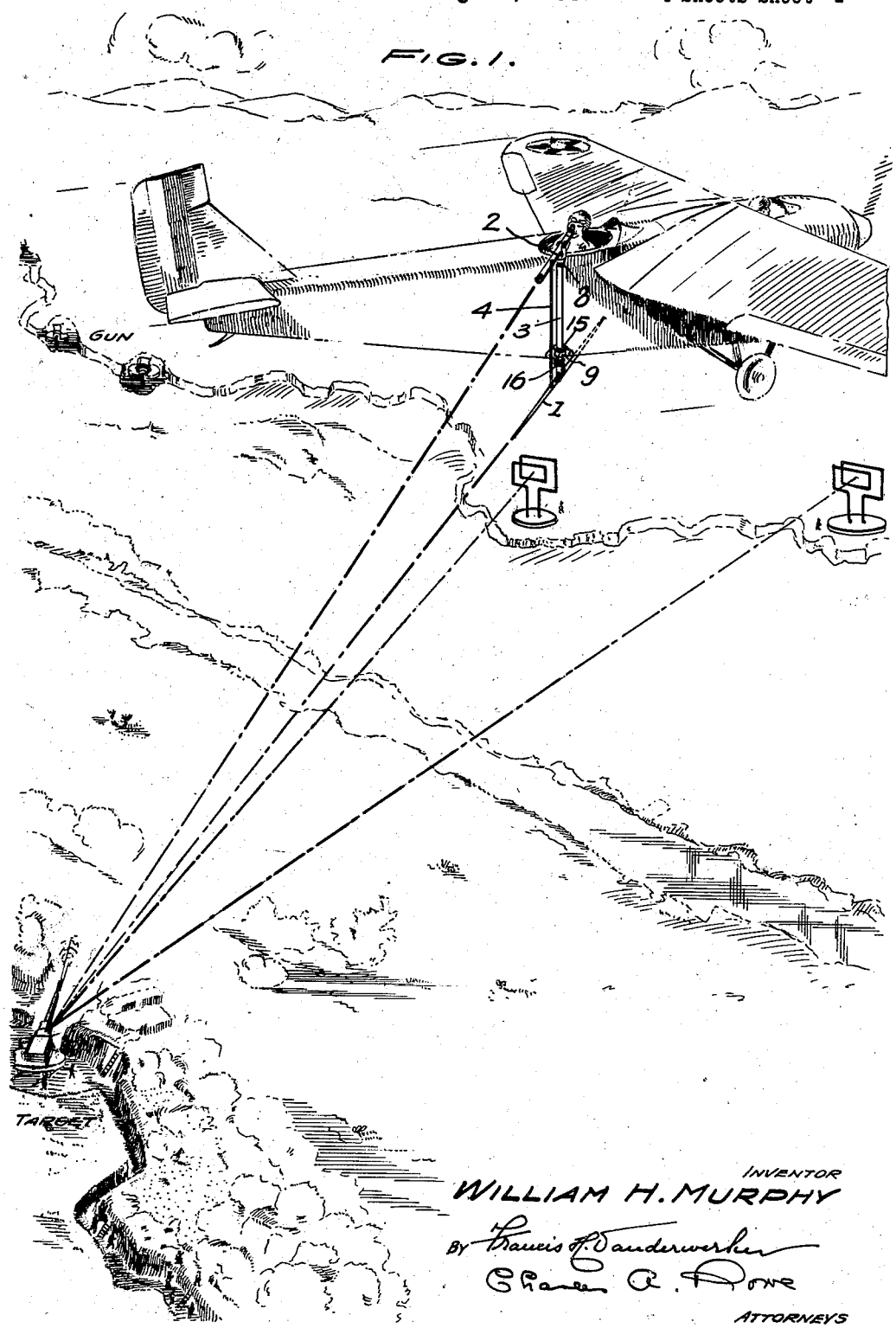
Fig. 1 shows an arrangement of control or direction finding stations in relation to an observing aircraft, a target and a gun enplacement.

Referring to Fig. 8 of the drawings, assume that a dipole antenna, or a quarter wave length antenna, is located at an elevated point A, for example in an airplane; assume that C is the point or trace on the horizontal plane at which the antenna, if extended theoretically, would cut the horizontal plane; that O is the vertical projection of the center of the dipole, and that B is a point on the horizontal plane at which a direction finder is located. If $\alpha$ is the vertical angle at point C between the horizontal OC and the inclined line AC $\cos \alpha = OC/AC$; $\beta$ is the angle of elevation at B between the horizontal BO and the line of sight BA and $\sin \beta = AO/AB$; $\theta_1$ is the horizontal angle between the line OD and the line OC and $\sin \theta_1 = DC/OC$; finally $\theta_2$ is the horizontal angle between the line BO and the line BC and $\tan \theta_2 = DC/BD$. The relationship of the angle $\theta_2$ with respect to the other three angles may be expressed as follows:

$$\tan \theta_2 = \frac{\cos \alpha \sin \beta \sin \theta_1}{\sin \alpha \cos \beta + \cos \alpha \sin \beta \cos \theta_1}$$

If now the dipole antenna is energized by a transmitter and a vertical loop antenna is located at B, then the bearing obtained either by the maximum or minimum method will be the bearing of the point C, and not of the point O, due to the effect of the non-vertical polarization of the radiated electric field. In other words the bearing on a target as represented by point C is thus determined directly without reckoning from the position of the radio transmitter and its antenna as a datum point.

Further considering the theoretical aspects involving the signal energy at the point of reception, the induced voltage in the loop of a direction finder can be shown to be the sum of the voltages induced by three components of the electrostatic field at the direction finder, namely, due to the vertical field component, the horizontal field component in the vertical plane of propagation, and the horizontal field component at right angles to the last named component. When the direction finder loop at B is so rotated that a line perpendicular to the plane of the loop extends to point C, then the voltages induced in the loop due to the vertical and horizontal field components in the vertical plane in which the transmitter and direction finder lie balance the voltage induced by the horizontal field component perpendicular to the above vertical plane.

Referring to Fig. 8, the angle $\theta_2$ indicates the point C which is the point at which the theoretically extended antenna reaches the ground, or the horizontal plane in which the receiver loop lies. If, therefore, a rigid antenna is directed or pointed longitudinally by means of a sighting device oriented along or parallel to such antenna, when the sighting device indicates the target for example, at point C, then if a signal or signals be transmitted during the sighting interval, a direction finder or several direction finders would obtain the bearing or bearings not of the radio transmitter and the aircraft which carries said transmitter, but the bearing or bearings of point C which is the target.

In carrying out the invention it is essential that a radiating antenna be provided which may be visually aligned by the observer with the longitudinal axis directed toward the object or target and in a plane passing vertically through observation point and target. A practical structural embodiment is shown in Fig. 3. In this instance a rigid dipole antenna as at 1 is mounted in operative relation with a telescopic sighting device 2. In order that the sighting device 2 may be maintained in parallelism with antenna 1, mechanical coupling means analogous to that of a pantograph are provided which comprise essentially a connecting rod 3 and link 4, of insulating material. Sighting device 2 is pivotally mounted at the upper end of rod 3 as at 5, and pivotally connected as at 6 to link 4. The rigid dipole antenna 1 is pivotally mounted at the lower end of rod 3 as at 7 and is insulated at its median point of pivotal connection with rod 3. Said rod 3 is tubular and preferably stream-lined, and is mounted in bearings 8 and 9 to swing about its vertical axis. The antenna 1 is operative with a radio transmitter 10 through feeder wires 11 and 12 which connect through a pair of brushes 13 and 14 with corresponding slip rings 15 and 16 which are carried on rod 3 and properly insulated therefrom. A wire lead 17 is introduced into rod 3 which is preferably tubular, and is then electrically connected to the radiating arms of the dipole antenna as at 18 and 19. Bearings 8 and 9 are secured to the aircraft body, for example, the fuselage of an airplane as at 20 and 21. As the sighting device is manipulated for locating or spotting an object such as a target, the pantograph coupling movement maintains the antenna automatically in parallelism with said device and in the same vertical plane therewith, while both of said elements may be swung in azimuth about the rod 3 as a vertical axis. It should be noted in passing that the slight difference in height of the optical axis of the sighting device in relation to the longitudinal axis of a rigid form of antenna is negligible when considered in relation to the height of the aircraft and distance from the direction finders and causes no appreciable error.

Obviously, the type of antenna is not limited to a dipole, but other forms of rigid antenna may be employed with equal success. For example, as shown in Fig. 4, a rigid quarter wave antenna 1 may be attached in a manner similar to that shown in Fig. 3 so as to be rotatable about rod 3 as a vertical axis, which rod also carries at its upper end a telescopic sighting device 2 pivoted as at 5 and maintained in parallelism with the antenna 1 by the same pantographic coupling means afforded by link 4 of bakelite or other insulating material. As before the sighting device 2 and antenna 1 may be swung in azimuth about the vertical axis of rod 3, which rod is mounted in bearings 8 and 9 attached to the fuselage of an airplane. In this instance the antenna 1 is fed from the radio transmitter through a feeder wire 11 from the antenna post through brush 13 and slip ring 15, which is connected by a lead to the conductive portion of the antenna. The metal body or other metal structure of the craft serves as a counterpoise, connection from the ground post of the set being through lead 12.

Figure 5:
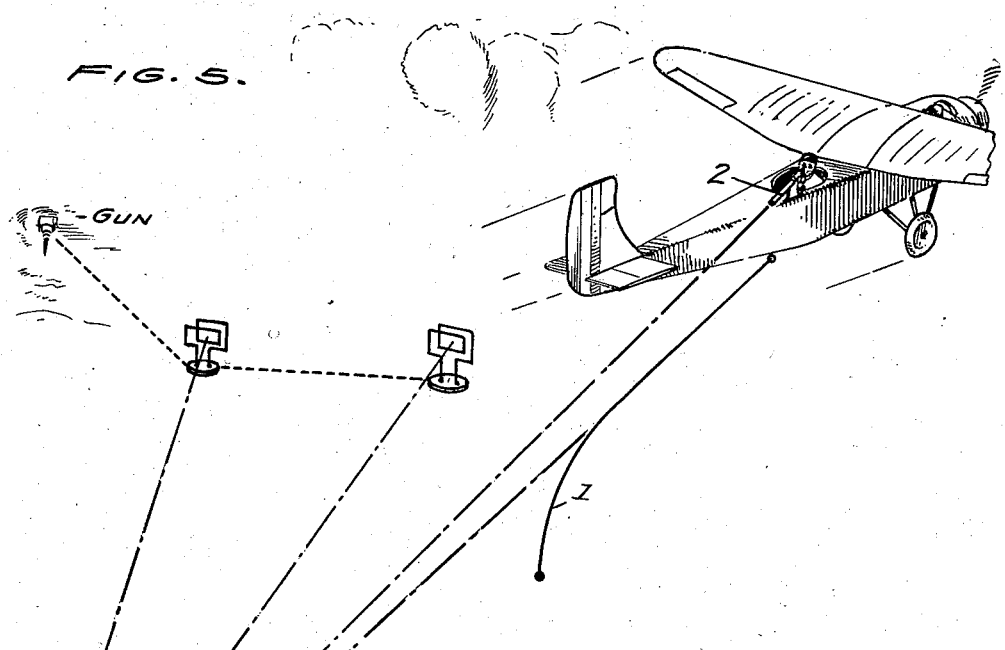
Fig. 5 is a view similar to Fig. 1 in which the observing aircraft is equipped with a trailing antenna.
Figure 6:
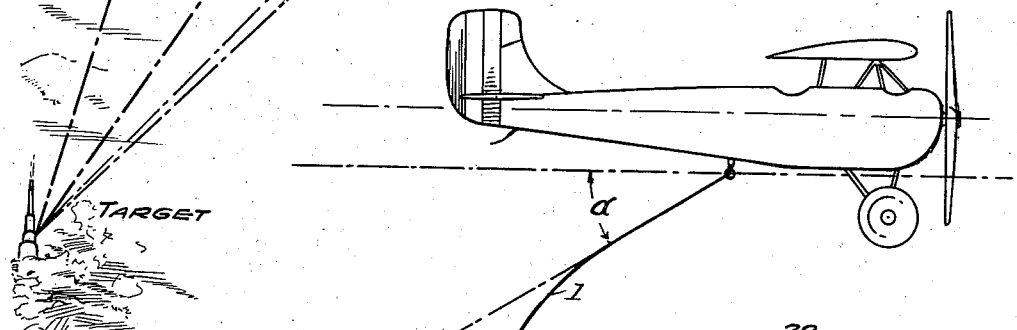
Fig. 6 shows a trailing antenna attached to an airplane in level flight to aid in visualizing the effective energy radiating portion of this type of antenna.

The principles of the invention also apply to a trailing antenna and such a form of antenna is shown in Figs. 5 and 6. Where a trailing antenna is used, it is well known that the antenna is suspended in a manner similar to a catenary and that the antenna will hang more nearly vertical the thinner the wire, the greater the attached weight, the shorter the antenna, and the slower the speed of the aircraft. As the current in this type of antenna is greatest at the lead end and drops off sinusoidally to zero at the bottom or trailing end, the form of the upper part of such antenna is most important so far as radiation is concerned, and the directional effect is closely that which would be obtained from a rigid antenna parallel to the upper part of the wire and having an angle below the horizontal as indicated in Fig. 6.

Where a rigid form of antenna is used, the practical operation of the system may be followed by reference to Figs. 1, 2, 3 and 4 and will be briefly outlined as follows: The aircraft having visually located the target the observer merely trains his sighting device 2 on the target, it being understood that in so doing the rigid antenna 1 is maintained automatically with its longitudinal axis in parallelism with the line of sight or optical axis of device 2, and in a plane passing vertically through the target and observation point. In practice a warning signal would first be sent so that the direction finder stations would be alert to receive and interpret a specified long dash signal or a succession of signals to follow. It is only necessary that the above described relation of sighting device, antenna and target be maintained during the interval that specified signals are being transmitted in order that the range and position of the target may be accurately determined. Thus the aircraft may take up any number of convenient positions out of the zone of anti-aircraft fire in time of war, and not immediately above the object or target as heretofore required by conventional practice.

Figure 7:
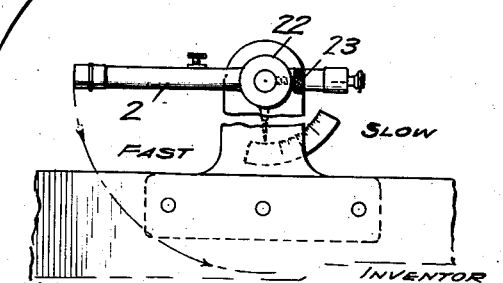
Fig. 7 shows a sighting device for use with such a trailing antenna, with a calibrated speed scale attached.

Inasmuch as such a trailing antenna cannot be oriented except by maneuvering the aircraft so that the antenna will trail in the longitudinal plane of the craft, it is necessary to provide a sighting device which in practice is so placed that its optical axis may be maintained parallel with the longitudinal axis of the airplane body. The sighting device for convenience may be made rotatable about a horizontal axis and suitable means of adjustment is provided so that the device may be oriented in altitude. Such a sighting device is shown in Fig. 7 attached to the side of an airplane fuselage and includes a manual adjustment in altitude such as hand wheel 22 and a set screw 23 is provided to retain the sighting device 2 in adjusted position. In practice, where a standard trailing wire antenna of definite size and length is used, the telescopic sighting device must be set for the air speed; the airplane is then flown toward the target until it is assured that on turning and flying away from the target a line of sight above the target will be obtained; the airplane is then reversed and flown directly away from the target in level flight. When the target appears in the telescopic sight of the sighting device, previously adjusted as aforesaid, a signal is transmitted and the direction finders, whose attention may be assured by a warning signal, will obtain the bearing of the target with respect to true north, or with respect to a definite base line, depending on the setting of the direction finder bearing scales. As before stated in connection with the rigid type antenna, it is immaterial where the airplane itself is located, that is to say, its signalling position may be well beyond the zone of anti-aircraft fire. It is very necessary that the optical axis of the sighting device may be aligned with the upper or effective radiating portion of such a trailing antenna longitudinally thereof and in a plane passing vertically through observation point and target at the time of transmitting the signals.

Referring now to Fig. 9, true north is along the line B N. If a direction finder at B has its bearing scale oriented in such a manner that north is zero, then the true bearing of the line B D will be the angle $\phi$, and the true bearing of the line B C will be $\phi+\theta 2$ or $\phi 1$, which will be the bearing obtained by the direction finder if C is the trace or the point on the ground at which the dipole antenna at A if extended would reach the ground.

Similarly Fig. 10 shows the bearing obtained if the direction finder scale is oriented with respect to a definite base line B B1 in such manner that a bearing in the direction B1 is 180°. In such case, the bearing obtained will be the bearing of the point C, namely $\phi 3$ which is equal to $\phi 2+\theta 2$.

If a second direction finder is now located at the point B 1, as shown in Fig. 11, and its scale is similarly oriented, then the bearing $\phi 4$ will be obtained. It will be obvious, therefore, that if C is a target its position can be readily traced on a map by laying off the two bearings, for example with respect to a base line B B1, or by automatically indicating such bearing on a map by beams of light remotely controlled by the two direction finders at corresponding points B B1 on the ground.

Furthermore, as shown in Fig. 12, a battery at E can be layed to fire on such a target by obtaining the bearing of the target at C with respect to the battery at E.

Changes and modifications are contemplated within the scope and spirit of the invention, as defined by the appended claims:

I claim:

1. A system of the character described, comprising radio signalling means and including an antenna for radiating signal energy, said antenna being placed at an observation point in visual range of an object and having a directional characteristic when its longitudinal axis is in alignment with said object; means including an adjustable sighting element for determining when the antenna is in longitudinal alignment with the object and in a plane passing vertically through observation point and object; and means at a station or stations remotely located from said object to indicate a bearing on the object, said means including a bearing coil responsive to a component of the signal energy having a directional relation to said object when transmitted during the period of such alignment.

2. A system of the character described, comprising radio signalling means located at an observation point in visual range of an object, and including an antenna for radiating signal energy to a station or stations beyond the visual range of the object; means for determining when the antenna is aligned longitudinally with the object and in a plane passing vertically through observation point and object, said means including a sighting element adjustable in relation to the antenna and the object; and means at the stations including a bearing coil to indicate a bearing on the object from a directional component of the signal energy passing through the object and transmitted during the period of such alignment.

3. A system of controlling ordnance fire from an aircraft operated in visual range of a target, and in radio communication with direction finding stations; radio signalling means carried by the craft for transmitting modulated wave energy to said stations, and including an antenna for radiating said wave energy, said antenna having a directional characteristic in relation to the target when its effective radiating portion is longitudinally in alignment with said target; means including an adjustable sighting element for determining when the antenna is in longitudinal alignment with the target and in a plane passing vertically through observation point and target; and means at the stations to indicate a bearing on the target, said means including a bearing coil responsive to the directional component of the wave energy transmitted during the period of such alignment.

4. A system of controlling ordnance fire from an observation point in visual range of a target; means at the observation point comprising a radio transmitter for transmitting modulated wave energy to stations out of visual range of said target; means for determining the range and position of the target without reckoning from the position of the radio transmitter as a datum point, said means including an antenna operative with the transmitter having a directional characteristic in relation to said target when its longitudinal axis is in optical alignment with the target and in a plane passing vertically through observation point and target; means for determining the condition of alignment, comprising a sighting element adjustable in relation to antenna and target; and direction finding means at said stations including a bearing coil to obtain a bearing on the target from a directional component of the wave energy transmitted during the period of such alignment.

5. A system of controlling ordnance fire from an observation point in visual range of a target; means at the observation point comprising a radio transmitter for transmitting modulated wave energy to a station or stations out of visual range of said target; means for determining the range and position of the target without reckoning from the position of the transmitter as a datum point, said means including a rigid antenna operative with the transmitter and having a directional characteristic in relation to said target when its longitudinal axis is in optical alignment with the target and in a plane passing through observation point and target; a sighting element adjustable in altitude and azimuth for observing the target; means for maintaining the longitudinal axis of the antenna in parallelism with the optical axis of said element throughout the range of adjustment; and direction finding means at said stations including a bearing coil to obtain a bearing on the target from the directional component of the wave energy transmitted during the period of such alignment.

6. A system of controlling ordnance fire from an aircraft operated in visual range of a target, and in radio communication with direction finding stations located out of visual range of said target; radio signalling means carried by the craft for transmitting modulated wave energy to said stations, and including a rigid antenna adjustable in relation to the target, said antenna having a directional characteristic in relation to said target when its longitudinal axis is in optical alignment with the target and in a plane passing through observation point and target; a sighting element operative with the antenna for observing the target; means for adjusting said element in altitude and azimuth; means for maintaining the longitudinal axis of the antenna in parallelism with the optical axis of said element throughout the range of adjustment; and means at said stations including a bearing coil for obtaining bearings on the target from a component of said wave energy having a directional relation to the target when transmitted during the period of such alignment.

7. In a system of the character described which employs radio signalling apparatus located at an observation point in visual range of an object, said apparatus including an antenna to radiate modulated wave energy to direction finding stations; the method which comprises the step of visually aligning the antenna longitudinally in a plane passing vertically through observation point and object; transmitting a signal wave during the period of such visual alignment; and deducing the position of the object at the direction finding stations from a directional component of such signal energy transmitted while the condition of alignment is maintained.

8. A system of the character described, comprising radio signalling means located at an observation point in visual range of an object and including a radiating antenna for transmitting signal energy to stations beyond the visual range of said object; a sighting element for visually determining when said antenna is aligned longitudinally in a plane passing vertically through said observation point and said object; means to adjust said element to orient the observed optical axis in parallel relation with the longitudinal axis of the antenna; and means at said stations for obtaining a bearing on the object from a directional component of the signal energy transmitted during the period of said alignment.

9. In a system of controlling ordnance fire from an observation point in visual range of a target, and employing radio signalling means comprising a radiating antenna for sending a modulated wave to radio direction finding stations; the method of control which comprises the step of visually aligning the antenna longitudinally in a plane passing vertically through observation point and target; transmitting a modulated radio wave at the instant of such visual alignment; and obtaining a direct bearing on the target from the directional signal data received during the period of such alignment at the direction finding stations.

10. In a system of controlling ordnance fire from an observing aircraft operated in visual range of a target, said craft being provided with radio signalling means, including a radiating antenna to establish radio communication with direction finding stations; the method which comprises the step of visually determining from the craft when the antenna has its longitudinal axis in optical alignment with the target and in a plane passing vertically through observation point and target; transmitting a signal wave during the time of such alignment to establish a directional relation between the target and the effective longitudinal axis of said antenna; obtaining a direct bearing on the target at the direction finding stations from a directional component of the signal energy transmitted while maintaining said parallel relation.

11. In a system of controlling ordnance fire from an aircraft operated in visual range of a target, said craft being provided with means including a radiating antenna to establish radio communication with direction finding stations; the method of control which comprises the step of visually determining from the craft when the effective longitudinal axis of the antenna is in optical alignment with the target and in a plane passing through observation point and target; transmitting a modulated wave during the time of visual alignment to establish a directional relation between the optical axis and the effective longitudinal axis of the antenna; and obtaining a bearing on the target at the direction finding stations from a directional component of the signal energy received at the time of such alignment.

12. A system of controlling ordnance fire, which employs an aircraft operated in visual range of a target, and being in radio communication with direction finding stations; radio signalling means carried by the craft for transmitting modulated wave energy to said stations, and including a rigid antenna adjustable in relation to said target, said antenna having a directional characteristic in relation to said target when its longitudinal axis is in optical alignment with the target and in a plane passing through observation point and target; a sighting element for visually determining when said antenna is aligned longitudinally in a plane passing vertically through observation point and target, including means to adjust said element to orient the observed optical axis in parallelism with the longitudinal axis of said antenna; and means at the direction finding stations for obtaining the bearings and position of the target from a directional component of the signal energy transmitted during the period of such alignment.

WILLIAM H. MURPHY.